(12) United States Patent
Brady et al.

(10) Patent No.: US 9,452,694 B2
(45) Date of Patent: Sep. 27, 2016

(54) JUVENILE VEHICLE SEAT

(71) Applicant: Cosco Management, Inc., Wilmington, DE (US)

(72) Inventors: Robert O Brady, Sarasota, FL (US); Erik A Holmen, Sarasota, FL (US); Robert E Karnick, Jr., Tampa, FL (US); Alexander A Hussain, Sarasota, FL (US); Steven D MacFarlane, Bradenton, FL (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 113 days.

(21) Appl. No.: 14/079,427

(22) Filed: Nov. 13, 2013

(65) Prior Publication Data

US 2014/0132045 A1  May 15, 2014

Related U.S. Application Data

(60) Provisional application No. 61/725,887, filed on Nov. 13, 2012.

(51) Int. Cl.
A47C 7/62 (2006.01)
B60N 2/28 (2006.01)
B60R 7/04 (2006.01)

(52) U.S. Cl.
CPC .............. B60N 2/2866 (2013.01); B60R 7/043 (2013.01); *A47C 7/62* (2013.01); *B60N 2/28* (2013.01); *B60N 2/2821* (2013.01)

(58) Field of Classification Search
USPC .................. 297/188.11, 188.08, 256.11, 253
See application file for complete search history.

(56) References Cited

U.S. PATENT DOCUMENTS

| | | | |
|---|---|---|---|
| 2,544,896 A | 3/1951 | Nidetch | |
| 3,888,525 A * | 6/1975 | Kousens | 292/87 |
| 4,062,584 A | 12/1977 | Pinkham | |
| 4,291,915 A | 9/1981 | Cox | |
| 4,988,214 A * | 1/1991 | Clement | 384/18 |
| D335,773 S | 5/1993 | Douglas | |
| D357,129 S | 4/1995 | Tiramani | |
| 5,524,957 A * | 6/1996 | Gibriano | 297/144 |
| 5,683,137 A | 11/1997 | McDonald | |
| 5,795,044 A * | 8/1998 | Trewhella et al. | 312/333 |
| 5,908,218 A * | 6/1999 | Martin | 297/182 |
| 6,220,662 B1 | 4/2001 | Vila | |
| 6,238,031 B1 * | 5/2001 | Weng | 312/333 |
| 6,343,837 B1 | 2/2002 | Gage | |
| 6,390,345 B1 | 5/2002 | Brown | |
| 6,550,862 B2 * | 4/2003 | Kain | 297/250.1 |
| 6,623,074 B2 | 9/2003 | Asbach | |
| 6,705,676 B1 | 3/2004 | Berringer | |
| 7,059,677 B2 | 6/2006 | Balensiefer et al. | |
| 7,513,000 B2 * | 4/2009 | DeBraal et al. | 5/600 |
| 7,547,050 B1 * | 6/2009 | Miglieri et al. | 292/84 |
| 7,726,738 B1 * | 6/2010 | Rice | 297/256.12 |
| 7,798,571 B2 | 9/2010 | Billman | |

(Continued)

FOREIGN PATENT DOCUMENTS

GB  2216780 A * 10/1989 ............ A47B 88/04

*Primary Examiner* — David E Allred
(74) *Attorney, Agent, or Firm* — Barnes & Thornburg LLP

(57) ABSTRACT

A juvenile vehicle seat for use with a passenger seat includes a base and a drawer. The base is adapted to boost a child relative to an underlying vehicle seat. The drawer is coupled to the base to move into and out of a drawer-receiving cavity formed in the base.

15 Claims, 13 Drawing Sheets

(56) References Cited

U.S. PATENT DOCUMENTS

| | | |
|---|---|---|
| 7,942,478 B2 | 5/2011 | Cymbalski |
| 8,123,294 B2 | 2/2012 | Hutchinson |
| D683,142 S | 5/2013 | Goldberg |
| 8,498,108 B2 * | 7/2013 | Chen et al. .............. 361/679.37 |
| 8,714,355 B2 * | 5/2014 | Huang .......................... 206/503 |
| 2002/0017808 A1 | 2/2002 | Kain |
| 2006/0152117 A1 * | 7/2006 | Goetsch et al. ........... 312/348.3 |
| 2009/0127902 A1 | 5/2009 | Meeker |
| 2009/0152912 A1 * | 6/2009 | Yu ............................... 297/195.1 |
| 2009/0242695 A1 * | 10/2009 | Lamoree et al. ............. 244/1 R |
| 2010/0244503 A1 | 9/2010 | Fiore |

* cited by examiner

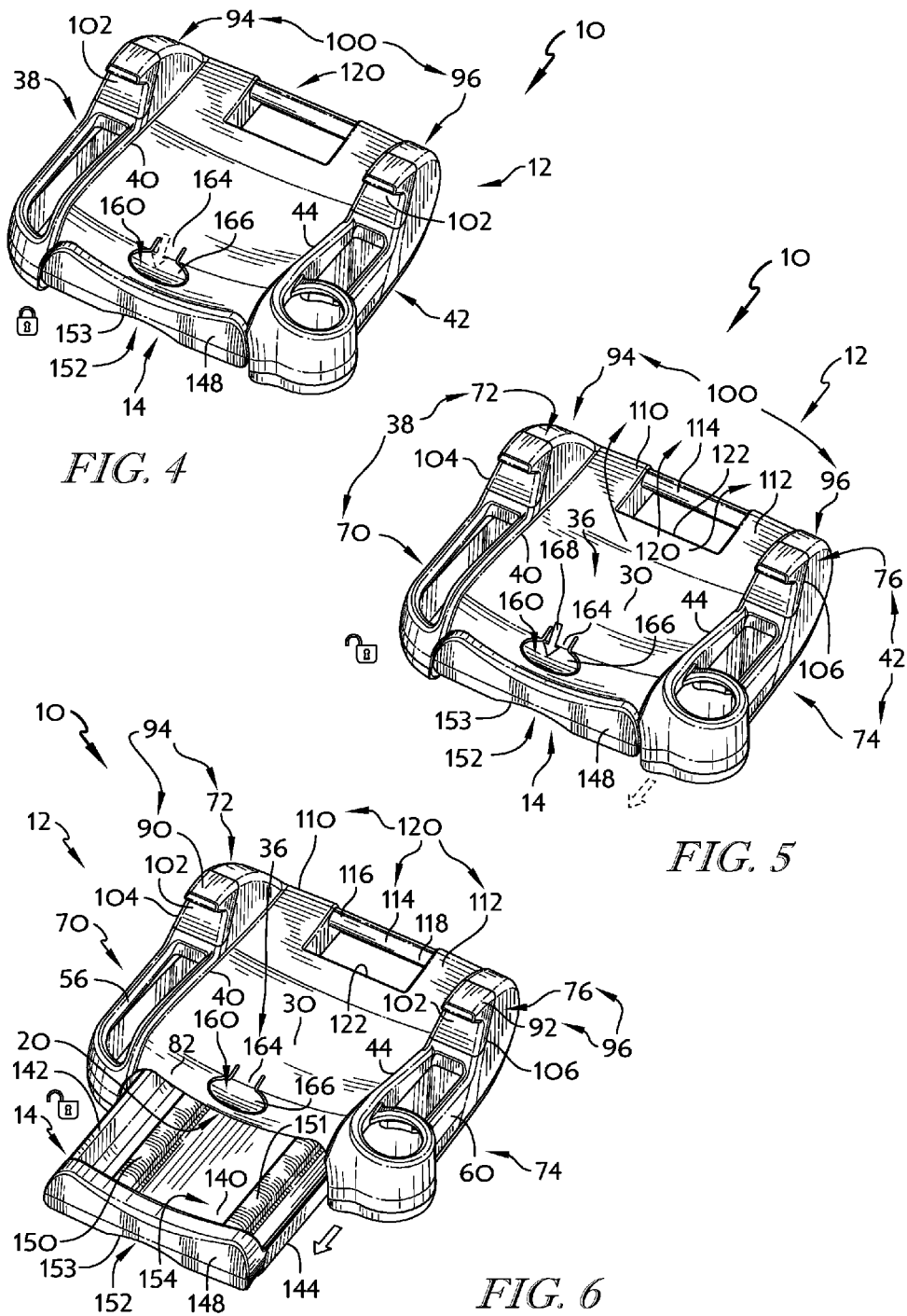

JUVENILE VEHICLE SEAT

PRIORITY CLAIM

This application claims priority under 35 U.S.C. §119(e) to U.S. Provisional Application Ser. No. 61/725,887, filed Nov. 13, 2012, which is expressly incorporated by reference herein.

BACKGROUND

The present disclosure relates to juvenile vehicle seats, and particularly to juvenile vehicle seats for supporting children on passenger seats in a vehicle. More particularly, the present disclosure relates to juvenile vehicle seats adapted to be coupled to vehicle seats by a vehicle child-restraint belt system.

SUMMARY

According to the present disclosure, a juvenile vehicle seat is provided for supporting a child on a passenger seat in a vehicle. The juvenile vehicle seat includes a base adapted to rest on a passenger seat in a vehicle. A child may sit on a seat bottom included in the base and be restrained by a child restraint belt coupled to a belt guide also included in the base.

In illustrative embodiments, the juvenile vehicle seat includes a drawer mounted to the base. The drawer is mounted to be pulled out of the base from a closed position arranged in a drawer-receiving cavity formed by the base to an opened position arranged substantially outside the drawer-receiving cavity to allow access to a storage space formed by the drawer.

In illustrative embodiments, the juvenile vehicle seat also includes a drawer-motion controller that blocks or allows the drawer to move from the closed position to the opened position. In some embodiments, the drawer motion controller is coupled to the base and is adapted to be pressed downwardly before the drawer may be moved from the closed position to the opened position. In other embodiments, the drawer-motion controller is coupled to the drawer and is adapted to be lifted upwardly to disengage a latch from a latch retainer formed in the base before the drawer may be moved from the closed position to the opened position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a juvenile vehicle seat arranged on a passenger seat in a vehicle and a seat belt coupling the juvenile vehicle seat to the passenger seat and showing that the juvenile vehicle seat includes a base, a drawer, and a drawer-motion controller, the base being adapted to boost a child relative to the vehicle seat, the drawer being coupled to the base for movement from a closed position shown in FIG. 1 to an opened position shown in FIG. 2, and the drawer-motion controller being coupled to the base and configured to block movement of the drawer from the closed position to the opened position at the option of a caregiver as suggested in FIGS. 4-6;

FIG. 2 is a view similar to FIG. 1 with the drawer moved to the opened position from the closed position, shown in FIG. 1, to expose a portion of a storage volume provided in the drawer so that a caregiver can access items stored in the drawer;

FIG. 3 is an exploded perspective view of the juvenile vehicle seat of FIGS. 1 and 2 with the drawer removed from the base showing that the base includes a seat bottom for supporting a child on the vehicle seat, a belt guide including a guide post on each side of the seat bottom and arranged to guide the vehicle seat belt over the seat bottom and a child supported on the seat bottom as suggested in FIG. 1, and a side rail arranged along each of a left and a right side of the seat bottom and showing that the seat bottom is formed to include a drawer-receiving cavity located between the lower panel and an overlying seat pad, and suggesting that the drawer slides through a drawer aperture formed in a front side of the seat bottom to move from the closed position received in the drawer-receiving cavity to the opened position substantially outside the drawer-receiving cavity;

FIG. 4 is a perspective view of the juvenile vehicle seat shown in FIGS. 1-3 showing that the drawer-motion controller included in the juvenile vehicle seat arranged in a locked position and arranged to block the drawer from moving from the closed position;

FIG. 5 is a perspective view similar to FIG. 4 showing that the drawer-motion controller has been moved from the locked position to the unlocked position in response to a caregiver applying a force to a release tab formed in the seat pad to free the drawer to move from the closed position to the opened position shown in FIG. 6;

FIG. 6 is a perspective view similar to FIGS. 4 and 5 showing the drawer has been moved from the closed position to the opened position while the drawer-motion controller is in the unlocked position so that a caregiver can access the storage volume provided in the drawer;

Figure 7:
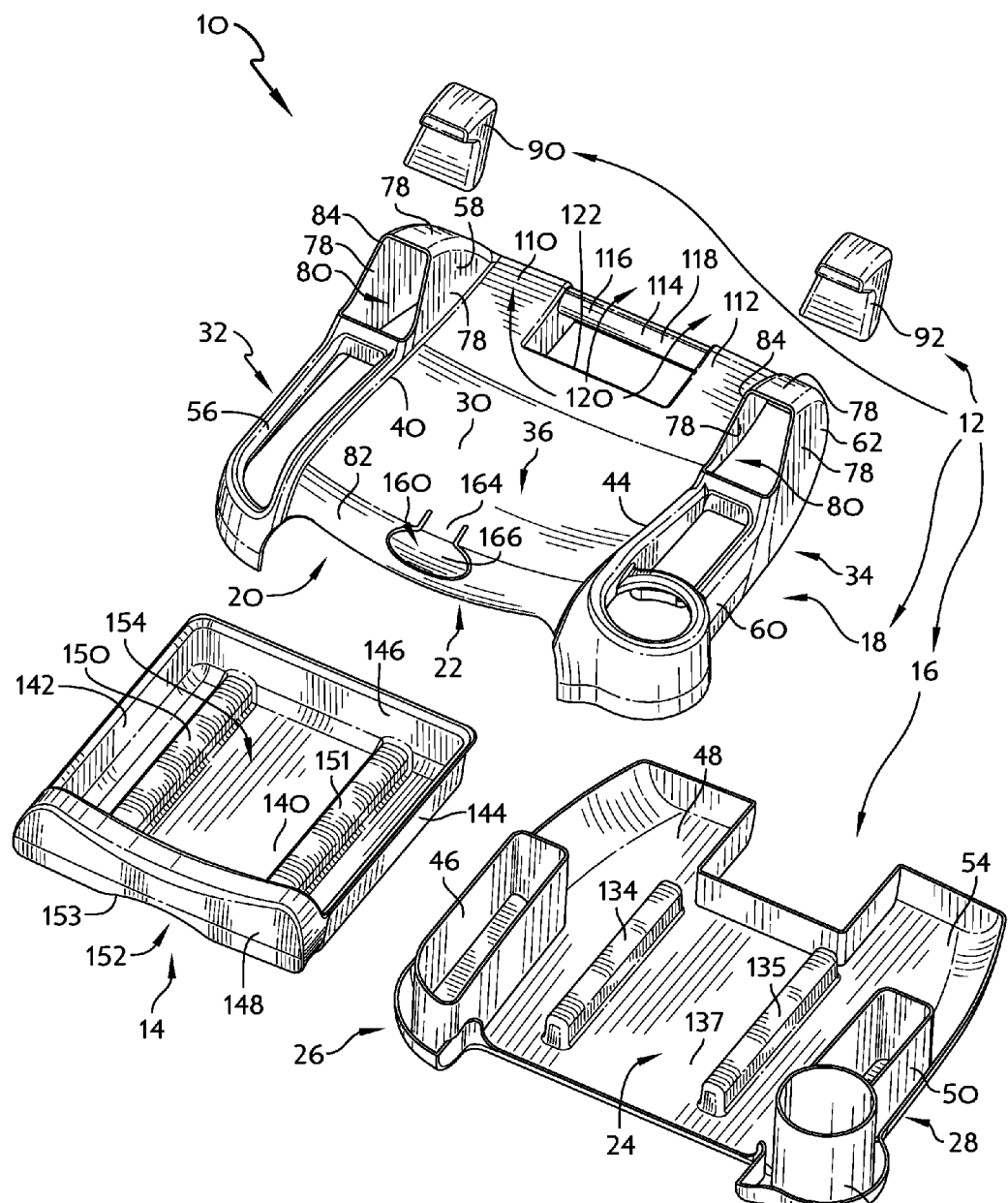
Figure 8:
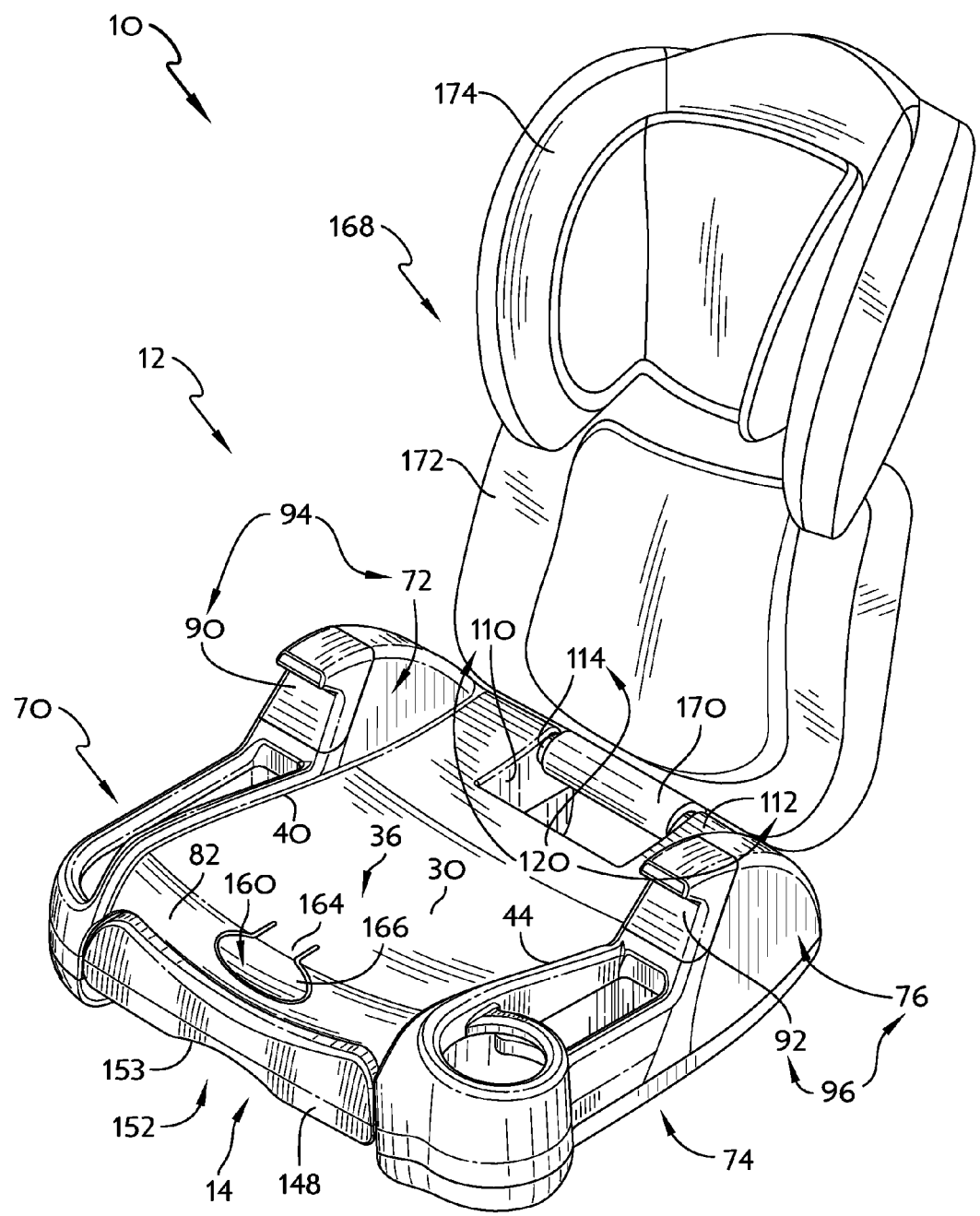
Figure 9:
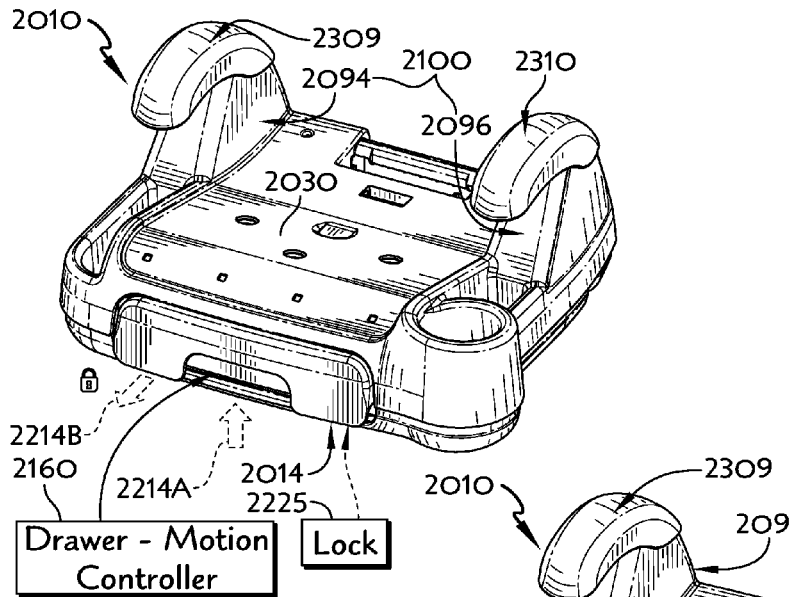
Figure 10:
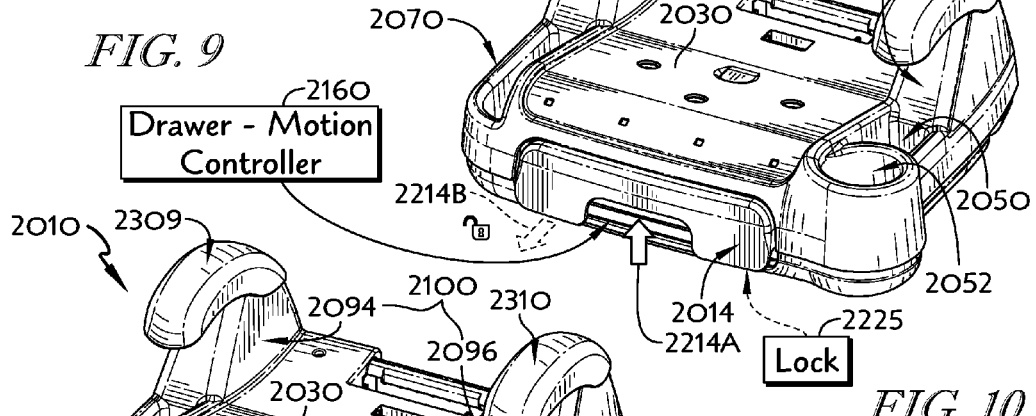
Figure 11:
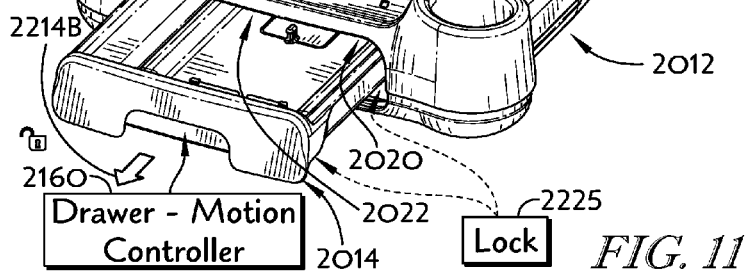
Figure 10A:
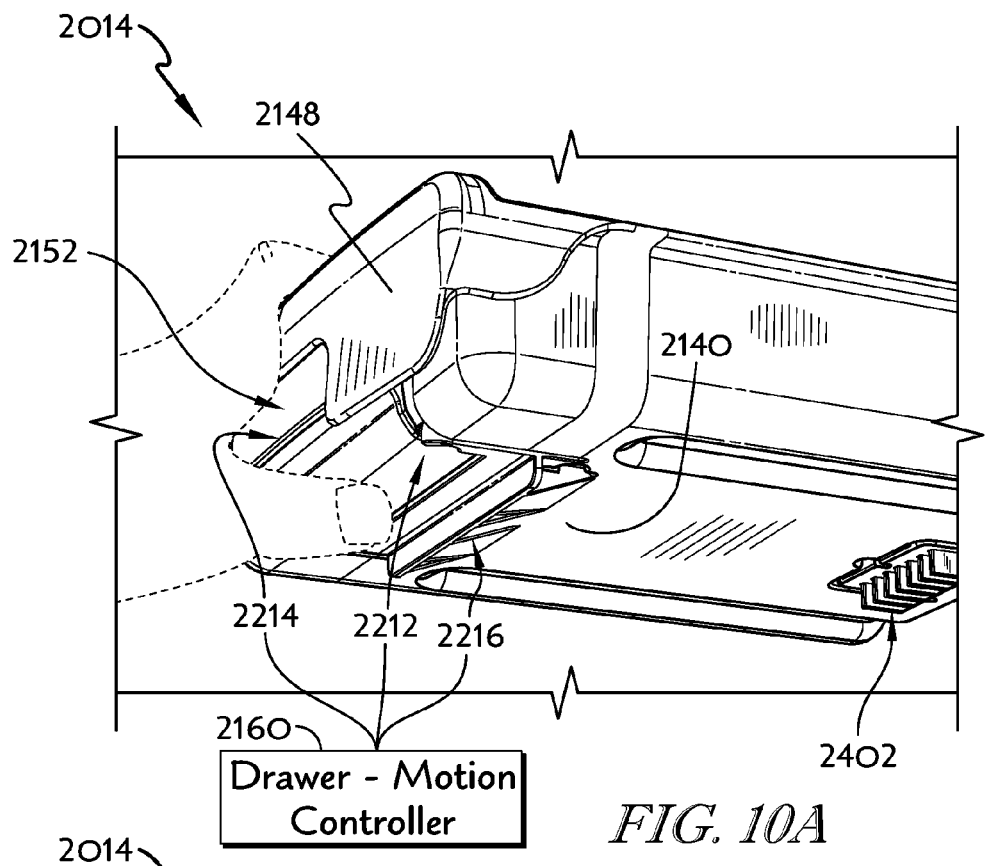
Figure 10B:
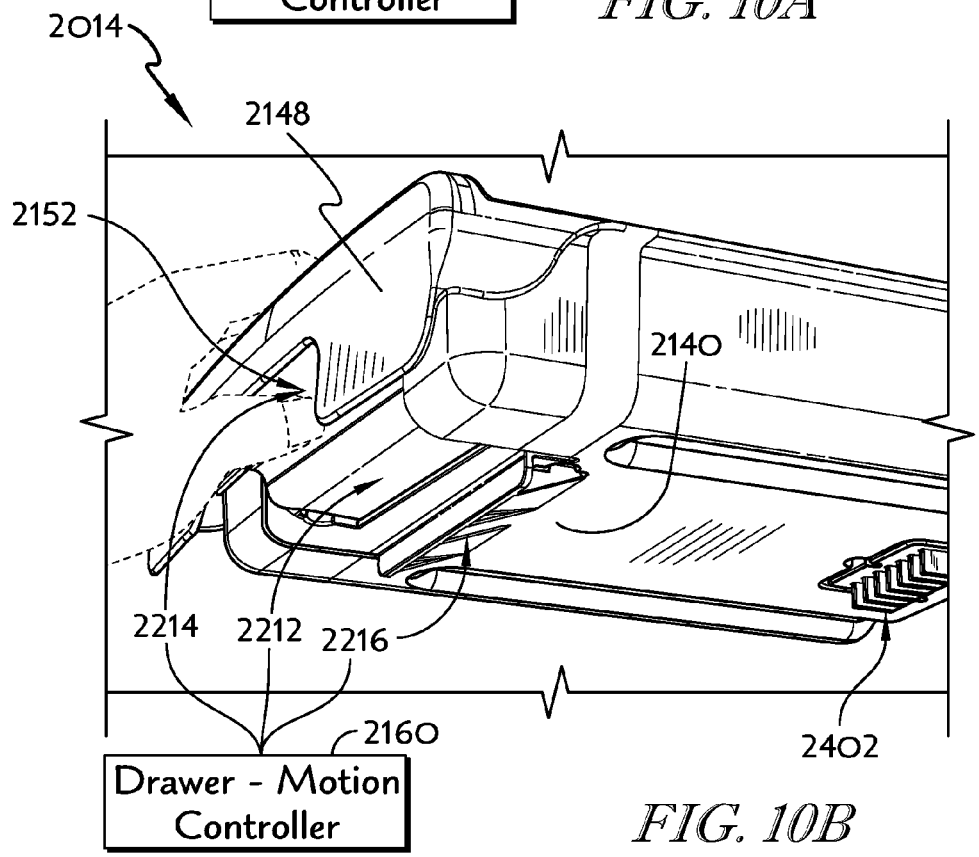
Figure 10C:
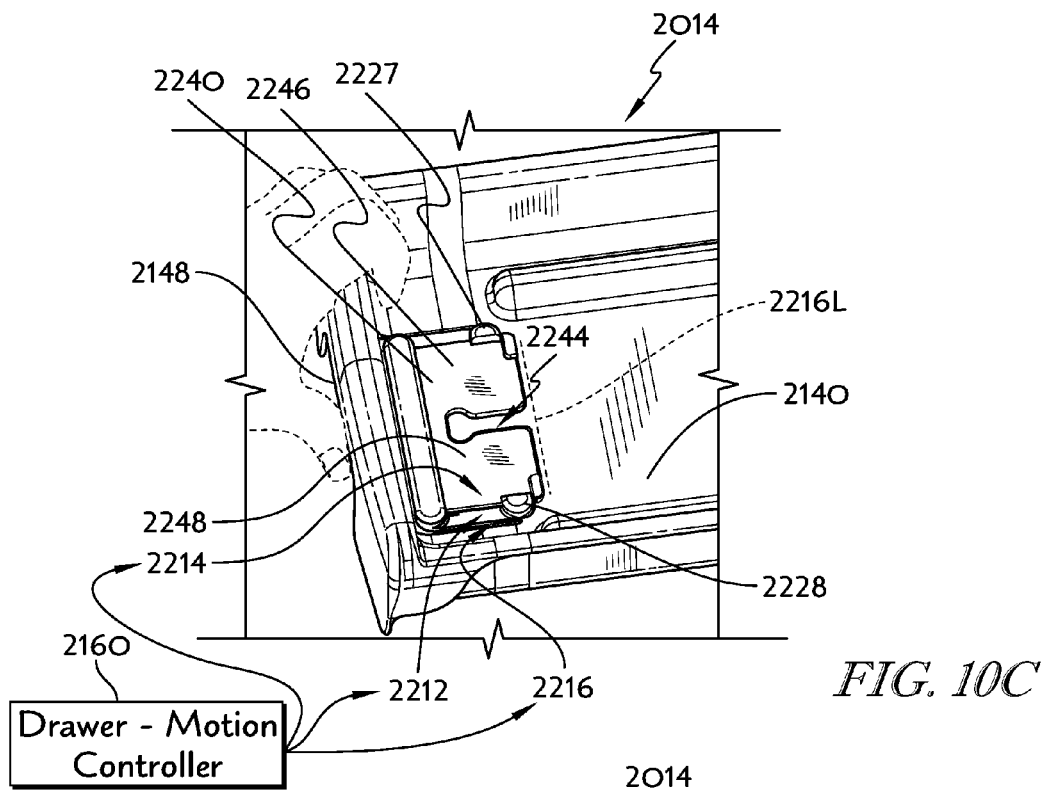
Figure 10D:
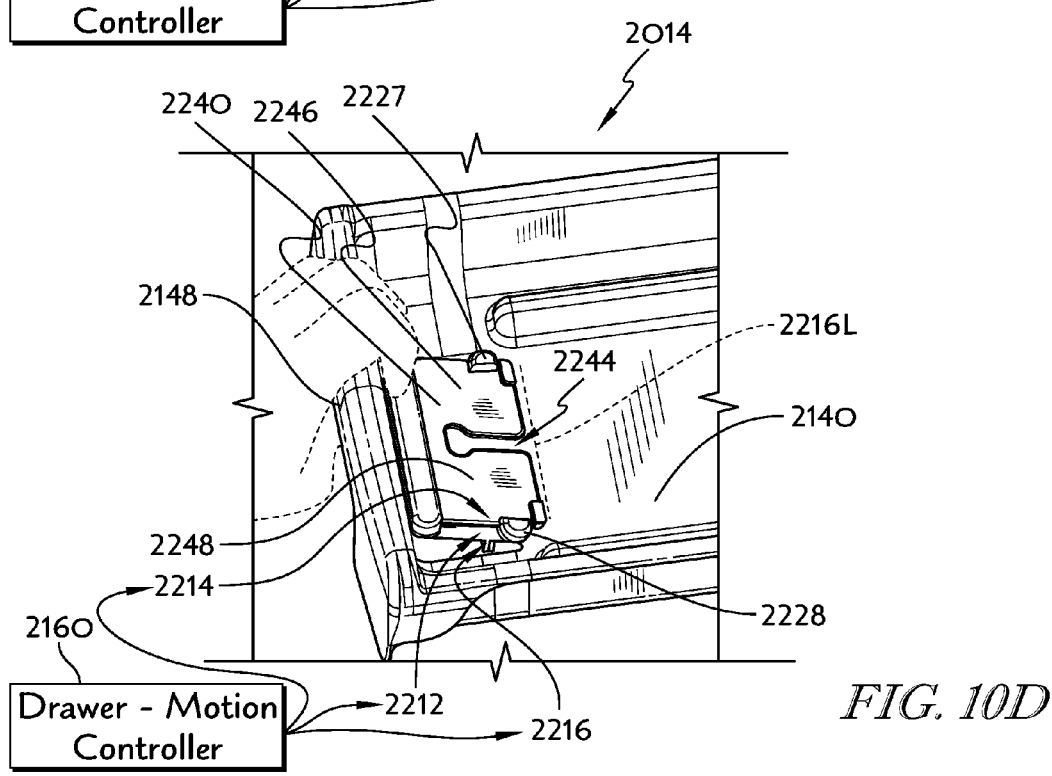
Figure 12:
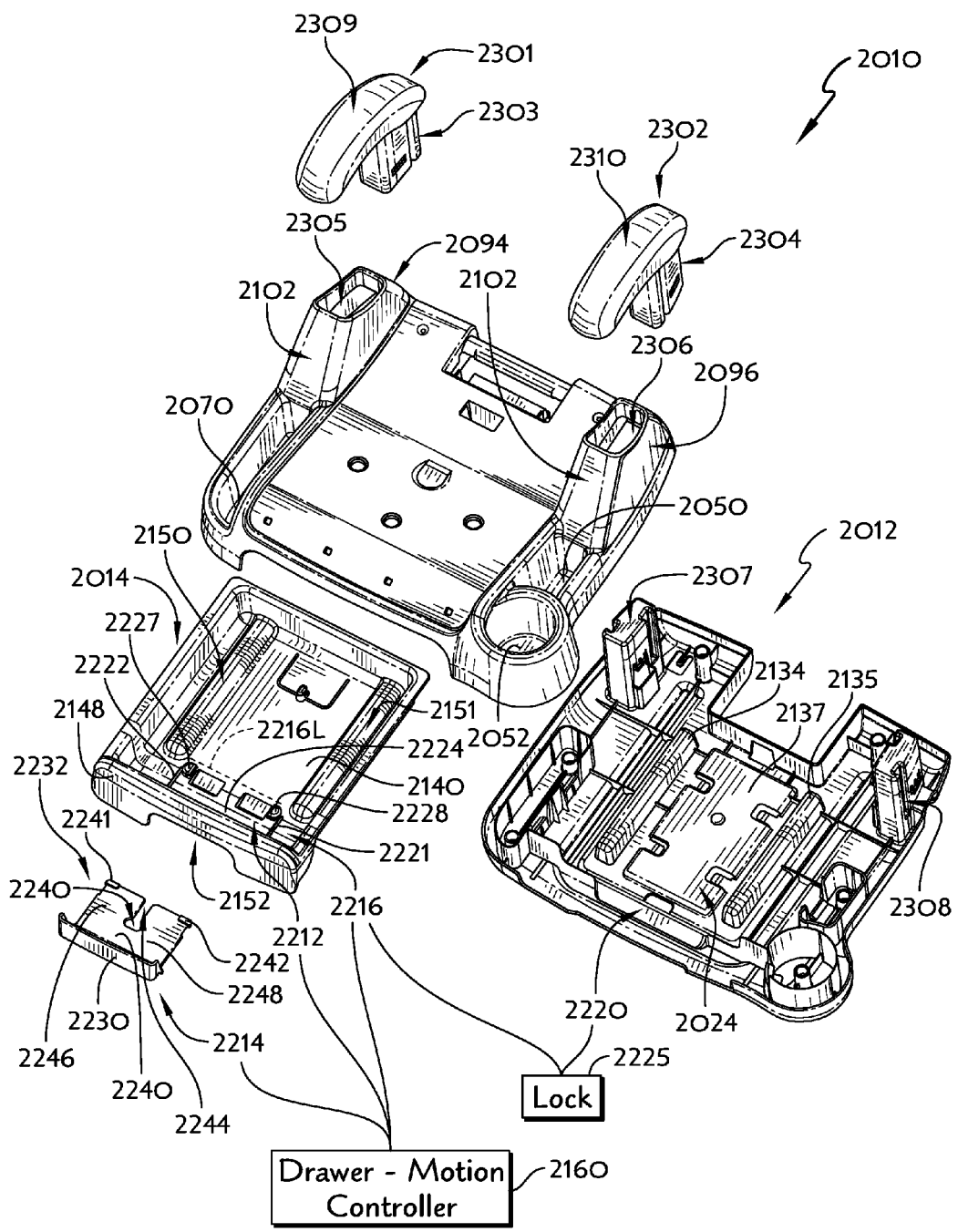
Figure 14:
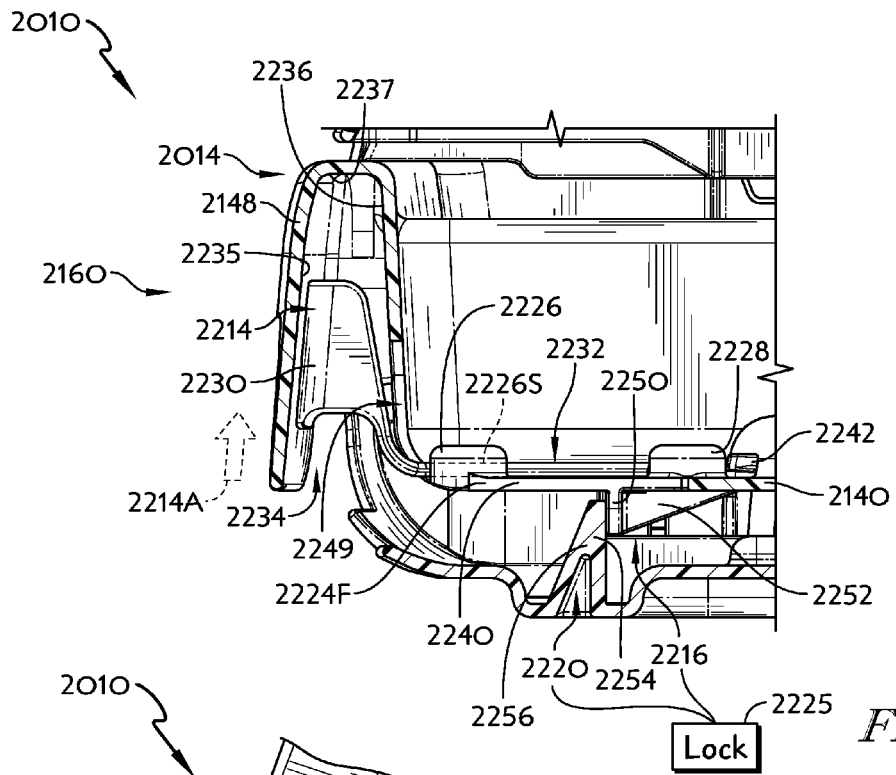
Figure 13:
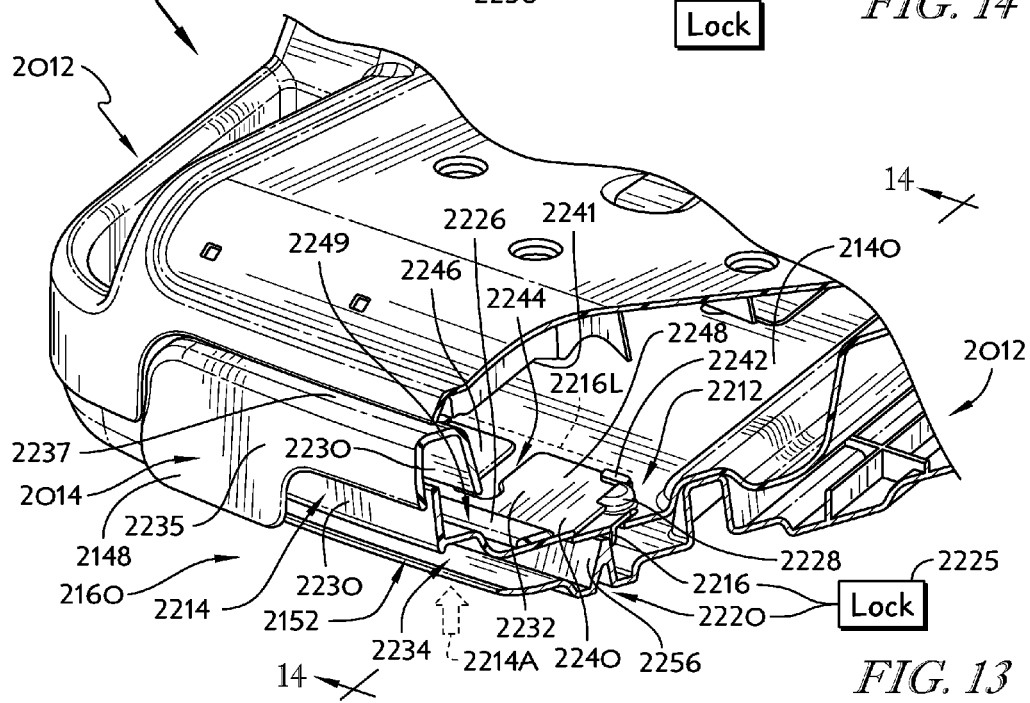
Figure 16:
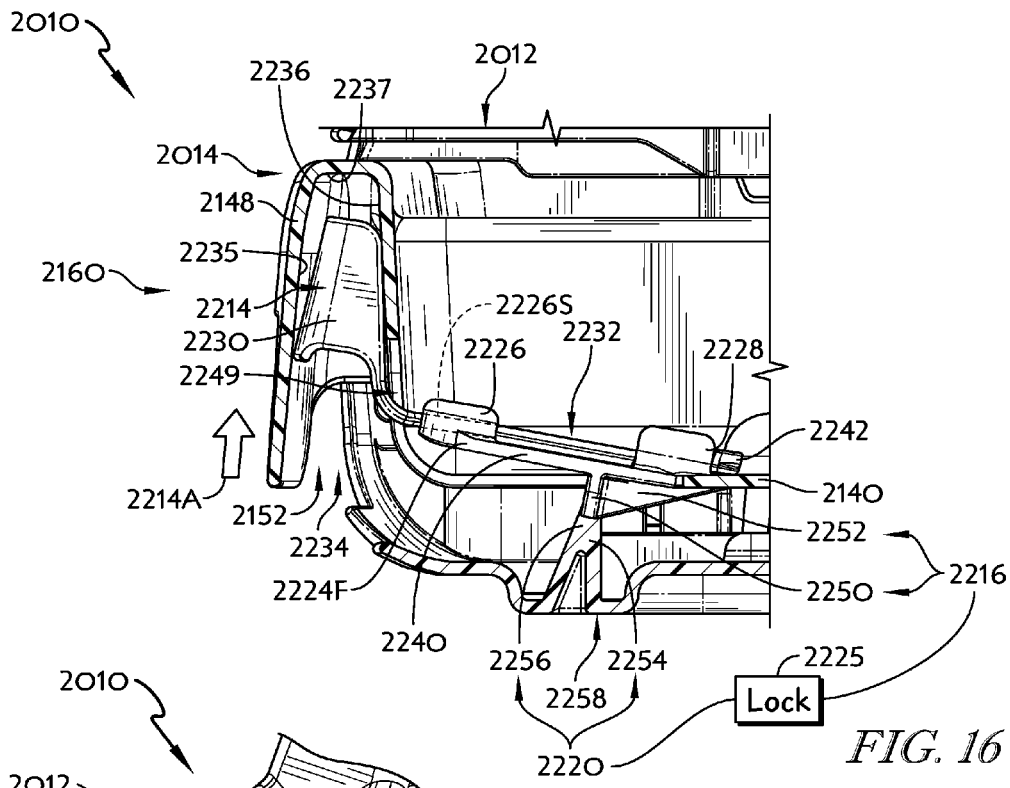
Figure 15:
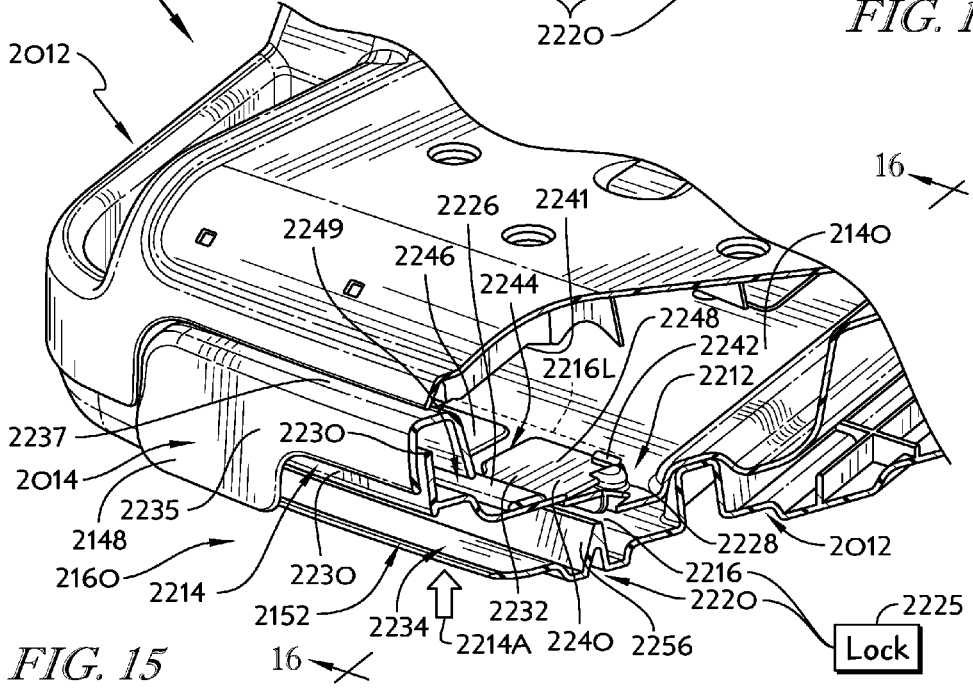
Figure 18:
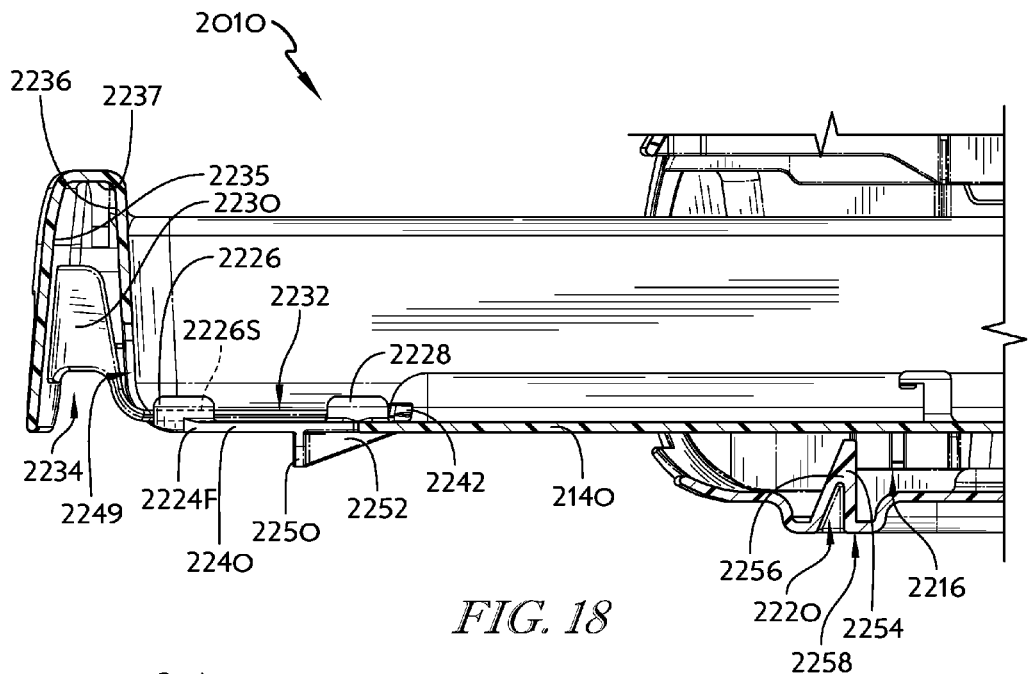
Figure 17:
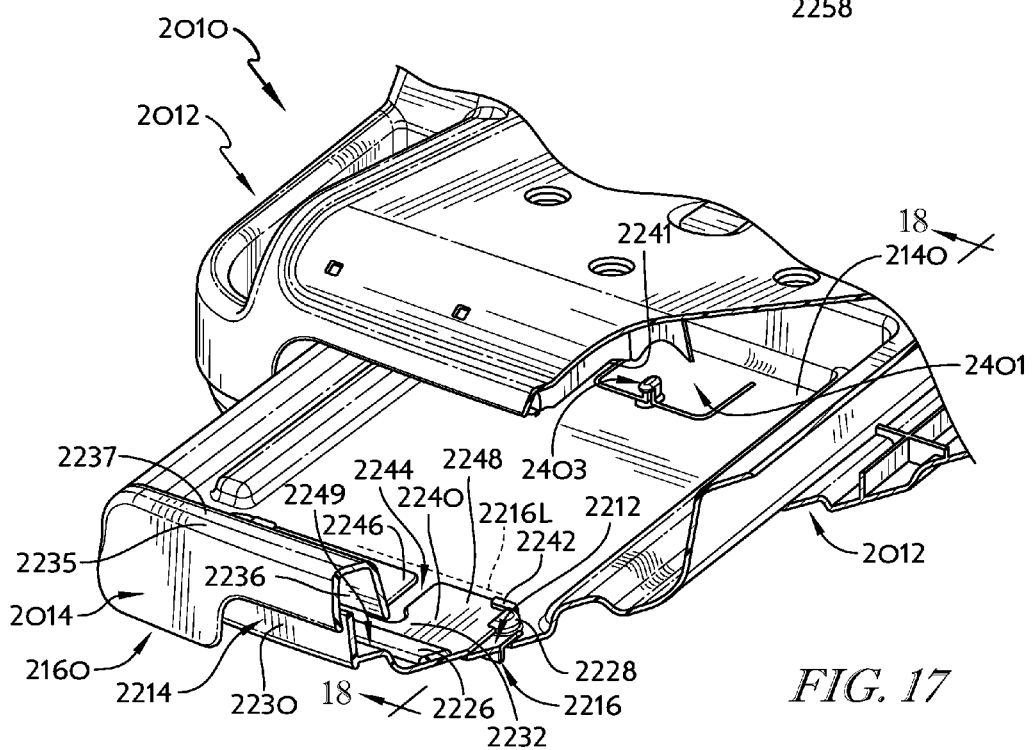
Figure 19:
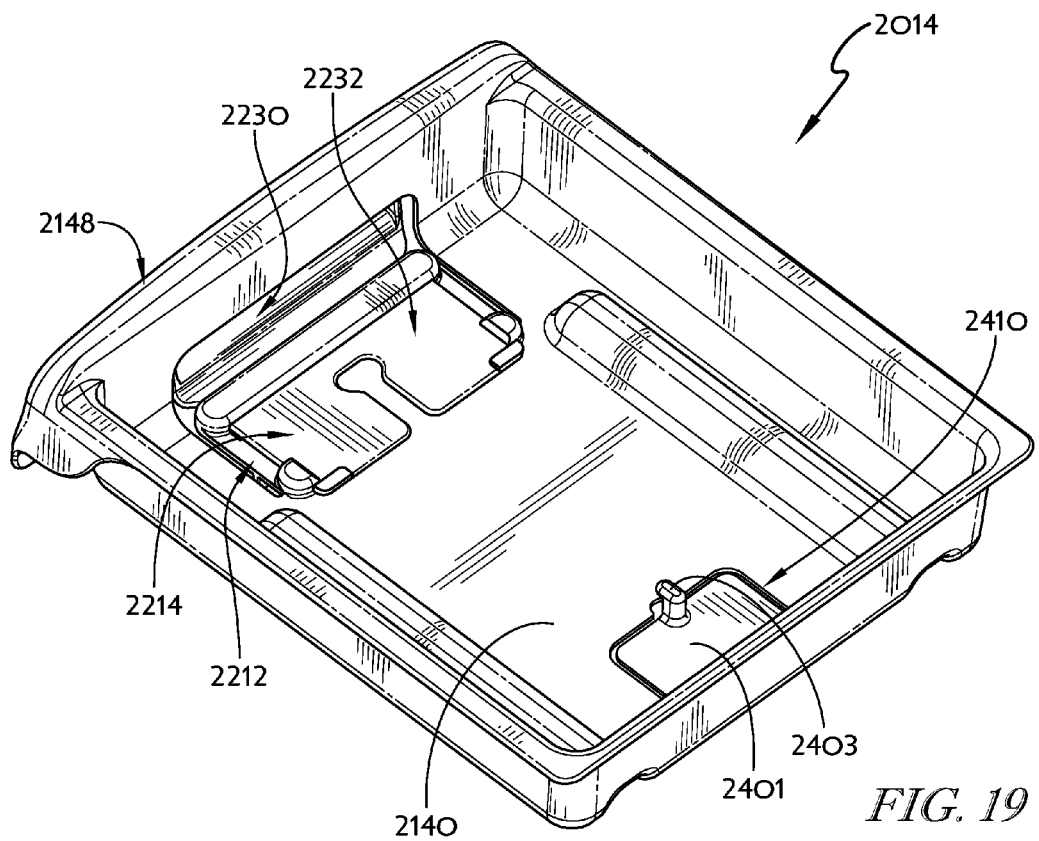
Figure 20:
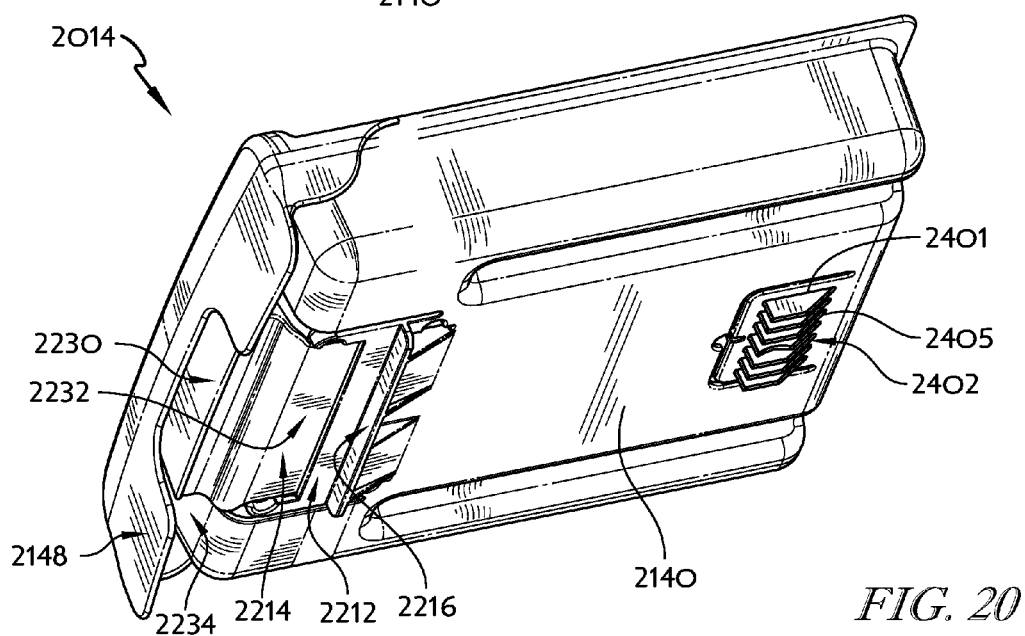

FIG. 7 is an exploded perspective view of the juvenile vehicle seat of FIGS. 1-6 showing that the drawer and the base of the juvenile vehicle seat includes a lower shell, and an upper shell configured to overlie and mate with the lower shell to form the drawer-receiving cavity therebetween, and the lower shell includes the left mount support, the right mount support, and a lower panel lying between the left and right mount supports and forming a bottom side of the base, and also showing that the upper shell includes the left pad mount, the right pad mount, a seat pad lying between the left and right pad mount, and a seat back mount lying behind the seat pad;

FIG. 8 is a perspective view of another embodiment of a juvenile vehicle seat including a base including a seat bottom, a left side rail, a right side rail, and a seat back mount, a drawer, and a seat back coupled to the seat back mount of the base to extend upwardly from the base;

FIG. 9 is a perspective view of yet another juvenile vehicle seat that includes a base, a drawer, and a drawer-motion controller, the base being adapted to boost a child relative to the vehicle seat, the drawer being coupled to the base for movement from a closed position to an opened position as shown in FIG. 11, and the drawer-motion controller being coupled to the drawer and arranged to move relative to the drawer from a locked position to an unlocked position as shown in FIG. 10 to block or allow movement of the drawer from the closed position to the opened position at the option of a caregiver;

FIG. 10 is a view similar to FIG. 9 with the drawer-motion controller moved to the unlocked position in response to a user lifting up on a handle included in the drawer-motion controller that extends along a front side of the drawer so that the drawer is allowed to move from the closed position to the opened position as shown in FIG. 11;

FIG. 10A is a perspective view of a bottom of the drawer showing that the handle includes a grip and that the drawer-motion controller includes a latch arranged to extend downwardly below a floor of the drawer before a user lifts upwardly on the grip to move the latch and unlock the drawer-motion controller as shown in FIG. 10B;

FIG. 10B is a view similar to FIG. 10A showing that a user has lifted upwardly on the grip and that the latch moves upwardly with the grip and into the storage space of the drawer;

FIG. 10C is a perspective view of a top of the drawer showing that the handle includes a grip mount coupled to a flex tab included in the drawer-motion controller and showing that the latch extends downwardly from the flex tab;

FIG. 10D is a view similar to FIG. 10C showing that the grip mount couples the grip of the handle to the flex tab and allows a user to lift upwardly on the grip so that the latch moves upwardly in response to a user lifting upwardly on the grip;

FIG. 11 is a view similar to FIGS. 9 and 10 with the drawer moved to the opened position from the closed position to expose a portion of a storage volume formed by the drawer so that a caregiver can access items stored in the drawer;

FIG. 12 is an exploded perspective view of the juvenile vehicle seat of FIGS. 9-11 with the drawer removed from the base showing that the base includes a seat bottom for supporting a child on the vehicle seat, a belt guide including a guide post on each side of the seat bottom and arranged to guide the vehicle seat belt over the seat bottom and a child supported on the seat bottom, and a side rail arranged along each of a left and a right side of the seat bottom and showing that the drawer-motion controller includes a flex tab formed in a floor of the drawer, a handle adapted to be coupled to the flex tab, and a latch that extends down from the flex tab to mate with a latch retainer formed in a lower panel of the base;

FIG. 13 is a detail perspective view of a portion of the juvenile vehicle seat of FIG. 9 cut away to show the drawer-motion controller in the locked position in which the drawer-motion controller blocks movement of the drawer from the closed position to the open position prior to a caregiver lifting upwardly on the handle of the drawer-motion controller to move the drawer-motion controller to the unlocked position in which the drawer-motion controller allows movement of the drawer from the closed position to the open position as shown in FIG. 15;

FIG. 14 is a partial cross-sectional view of FIG. 13 taken along line 14-14 showing that when the drawer-motion controller is in the locked position, the latch of the drawer motion controller mates with the latch-retainer of the base to block movement of the drawer relative to the base until a caregiver lifts upwardly on the handle of the drawer-motion controller to move the latch upwardly and out of confronting-relation with the latch retainer as shown in FIG. 16;

FIG. 15 is a view similar to FIG. 13 showing the drawer-motion controller in the unlocked position after a caregiver has lifted upwardly on the handle of the drawer-motion controller so that the drawer-motion controller allows movement of the drawer relative to the base from the closed position to the opened position as shown in FIG. 17;

FIG. 16 is a partial cross-sectional view of FIG. 15 taken along line 16-16 showing that when the drawer-motion controller is in the unlocked position, the latch of the drawer motion controller is lifted out of confronting relation with the latch-retainer of the base to allow movement of the drawer relative to the base from the closed position to the opened position as shown in FIGS. 17 and 18;

FIG. 17 is a view similar to FIGS. 13 and 15 showing the drawer moved from the closed position to the opened position after a caregiver has unlocked the drawer-motion controller and has pulled the drawer outwardly from a drawer-receiving cavity formed by the base;

FIG. 18 is a partial cross-sectional view of FIG. 17 taken along line 18-18 showing that when the drawer is in the opened position, a tab-biasing ramp formed by the latch included in the drawer-motion controller faces a latch-camming ramp formed by the latch retainer included in the base so that the latch of the drawer-motion controller is temporarily moved upwardly over the latch-retainer of the base during movement of the drawer inwardly into the drawer-receiving cavity by a caregiver;

FIG. 19 is a top perspective view of the drawer of FIGS. 9-18 showing that the drawer includes a drawer-stop coupled to the floor of the drawer and formed by a U-shaped slot in the floor, the drawer stop has a flexible drawer-stop tab and a drawer-stop release coupled to a top surface of the drawer-stop tab, and suggesting that the flex drawer-stop tab flexes relative to the floor when a user pulls up on the drawer-stop release; and FIG. 20 is a bottom perspective view of the drawer of FIG. 9-19 showing that the drawer-stop also includes drawer-stop braces arranged to engage with the latch-retainer when the drawer is moved to the opened position to prevent the drawer from being completely removed from the drawer-receiving cavity.

DETAILED DESCRIPTION

A first juvenile vehicle seat 10 is shown in FIGS. 1-8 and a second juvenile vehicle seat 2010 is shown in FIGS. 9-18. Each juvenile vehicle seat 10, 2010 includes a base 12, 2012, a drawer 14, 2014, and a drawer-motion controller 160, 2160. Drawers 14, 2014 are mounted to be pulled out of corresponding bases 12, 2012 from a closed position arranged in a drawer-receiving cavity 20, 2020 formed by bases 12, 2012 to an opened position arranged substantially outside drawer-receiving cavity 20, 2020 to allow access to a storage space formed by drawer 14, 2014. Drawer-motion controllers 160, 2160 blocks or allows a corresponding drawer 14, 2014 to move from the closed position to the opened position.

Juvenile vehicle seat 10 is provided for supporting a child on a passenger seat 13 in a vehicle 15. Juvenile vehicle seat 10 includes base 12 adapted to rest on passenger seat 13 in vehicle 15. A child may sit on a seat bottom 36 included in base 12 and be restrained by a child restraint belt 19 coupled to a belt guide 100 also included in base 12.

Juvenile vehicle seat 10 includes base 12 and a drawer 14. Base 12 includes a lower shell 16 and an upper shell 18 as shown in FIG. 7. Lower shell 16 is adapted to mate with upper shell 18 to define a drawer-receiving cavity 20 in base 12 and a drawer aperture 22 opening into drawer-receiving cavity 20. Drawer-receiving cavity 20 is formed between lower shell 16 and upper shell 18. Drawer 14 is coupled to base 12 to move from a closed position, received in drawer-receiving cavity 20, to an opened position, at least in part outside drawer-receiving cavity 20.

Figure 3:
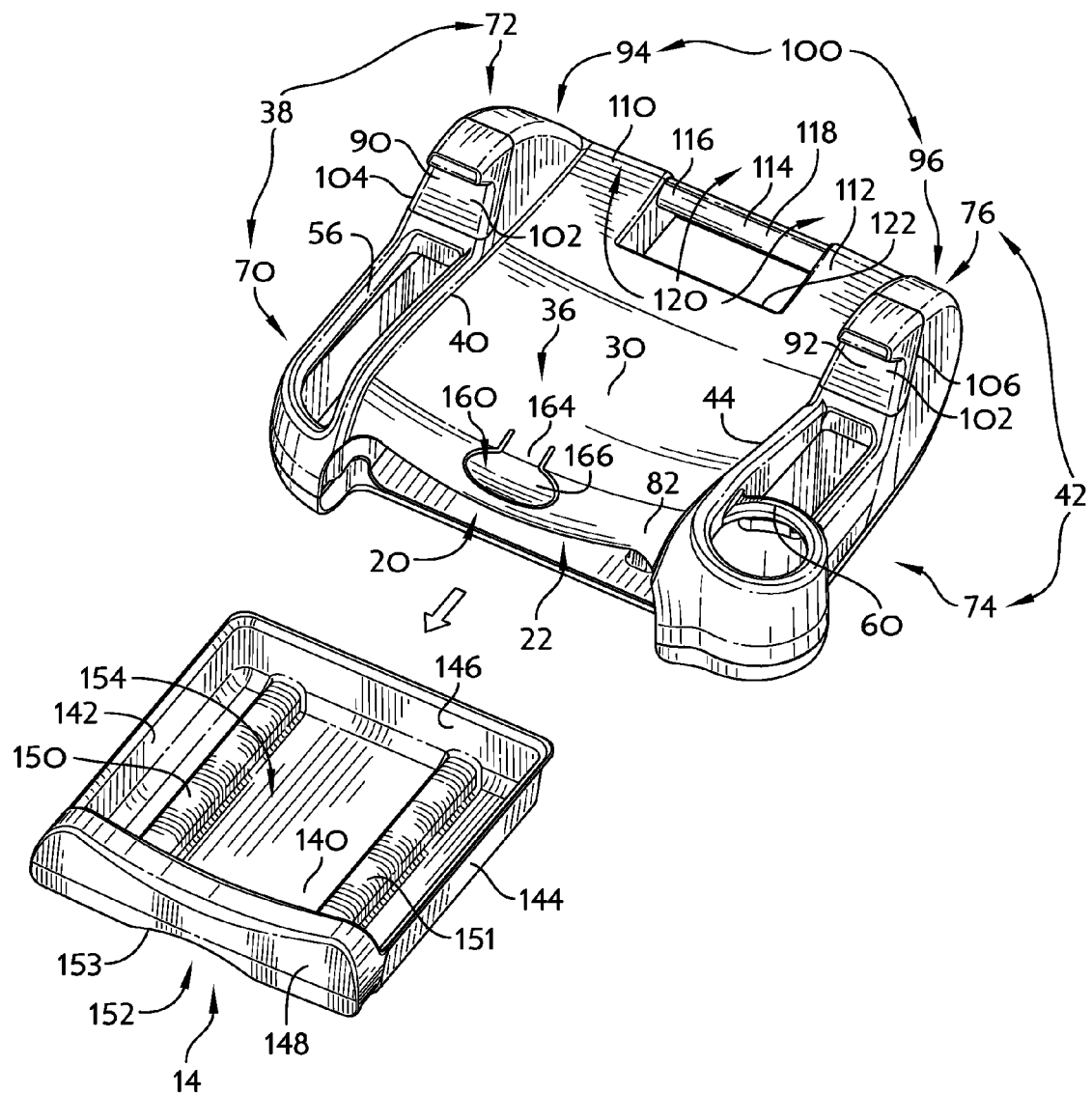

Lower shell 16 includes a lower panel 24, a left mount support 26, and a right mount support 28 as shown, for example, in FIG. 7. Upper shell 18 includes a seat pad 30, a left pad mount 32, and a right pad mount 34. Lower panel 24 is adapted to mate with seat pad 30 to form a seat bottom 36. Left mount support 26 is adapted to mate with left pad mount 32 to form a left side rail 38 coupled to a left side 40 of seat bottom 36 as shown in FIG. 3. Right mount support 28 is adapted to mate with right pad mount 34 to form a right side rail 42 coupled to a right side 44 of seat bottom 36. Seat bottom 36 is formed to include drawer-receiving cavity 20 and drawer aperture 22.

Left mount support 26 includes a left bin 46 and a left bracket support bottom 48 as shown in FIG. 7. Right mount support 28 includes a right bin 50, a cup holder 52, and a right bracket support bottom 54. Left pad mount 32 includes a left shroud 56 and a left bracket support top 58. Right pad mount 34 includes a right shroud 60 and a right bracket support top 62. When lower shell 16 and upper shell 18 are mated together, left bin 46 is adapted to mate with left shroud 56 to form a left storage basket 70 and left bracket support bottom 48 is adapted to mate with left bracket support top 58 to form a left bracket support 72 as shown in FIG. 3. Similarly, when lower shell 16 and upper shell 18 are mated together, right bin 50 and cup holder 52 are adapted to mate with right shroud 60 to form a right storage basket 74 and right bracket support bottom 54 is adapted to mate with right bracket support top 62 to form a right bracket support 76.

Left side rail 38 includes left storage basket 70 and left bracket support 72 as shown in FIG. 3. Right side rail 42 includes right storage basket 74 and right bracket support 76. In the illustrative embodiment, left bracket support 72 is formed to include a number of side walls 78 extending upwardly from seat pad 30 as shown in FIG. 7. Side walls 78 cooperate to define an opening 80 facing toward a front side 82 of seat bottom 36 and a bracket mounting surface 84 as suggested in FIG. 7. Right bracket support 76 is substantially similar to left bracket support 72 and similar features are indicated by like reference numbers.

Base 12 further includes a left bracket 90 and a right bracket 92 as shown in FIG. 7. Left bracket 90 is adapted to mate with bracket mounting surface 84 included in left bracket support 72 to close opening 80 and form a left guide post 94 as shown in FIG. 3. Right bracket 92 is adapted to mate with bracket mounting surface 84 included in right bracket support 76 to close opening 80 and form a right guide post 96.

Figure 1:
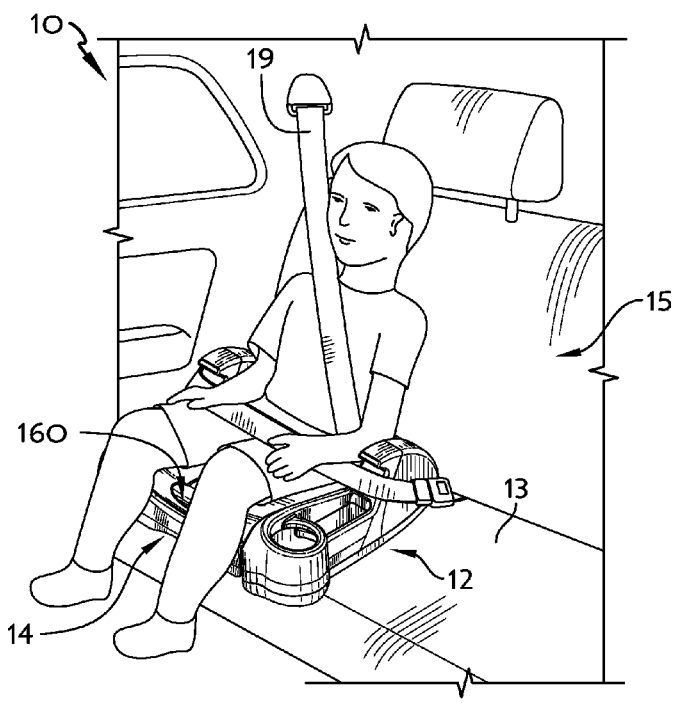
Figure 2:
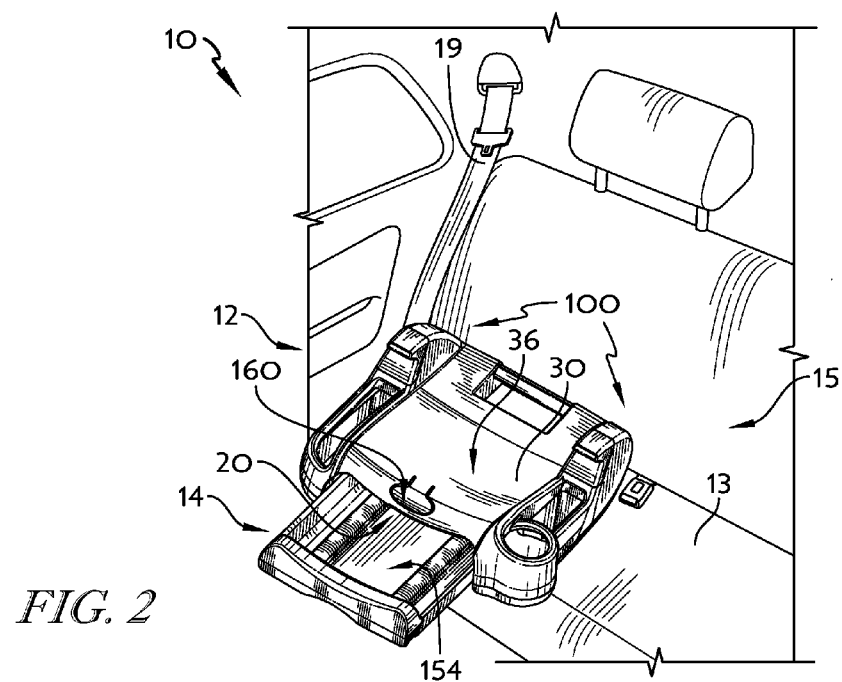

Left guide post 94 and right guide post 96 cooperate to define belt guide 100 as shown in FIG. 3. Left guide post 94 and right guide post 96 are formed to define a forwardly-opening belt-guide channel 102. Forwardly-opening belt-guide channel 102 extends between a left side 104 of left guide post 94 and a right side 106 of right guide post 96. As shown in FIG. 1, when the child is seated on seat pad 30, child restraint belt 19 is positioned to lie in forwardly-opening belt-guide channel 102 and is secured over the child and left and right guide posts 94, 96. Juvenile vehicle seat 10 is thereby coupled to passenger seat 13 and the child is thereby secured to juvenile vehicle seat 10 and passenger seat 13.

Upper shell 18 further includes a left flange 110, a right flange 112 spaced apart from left flange 110, and a shaft 114 including a first end 116 coupled to left flange 110 and a second end 118 coupled to right flange 112 as shown in FIG. 3. Left flange 110, right flange 112, and shaft 114 cooperate to define a seat back mount 120 coupled to a back side 122 of seat bottom 36. Seat back mount 120 is adapted for connection with a seat back that extends upwardly from seat bottom 36.

Drawer 14 included in juvenile vehicle seat 10 includes a floor 140, a left-side wall 142, a right-side wall 144, a back wall 146, and a front wall 148 as shown in FIG. 3. Front wall 148 is formed to include a handle aperture 152 sized to receive a caregiver's hand. The caregiver may insert part of their hand into handle aperture 152 and pull on an inside wall 153 formed in front wall 148 to move drawer 14 from the closed position to the opened position. Floor 140, left-side wall 142, right-side wall 144, back wall 146, and front wall 148 are formed to define a storage volume 154 provided in drawer 14.

Floor 140 is formed to include a pair of slide-receiver channels 150, 151 arranged to receive a pair of drawer-guide slides 134, 135 included in lower panel 24 as shown in FIG. 7. Drawer-guide slides 134, 135 are coupled to a floor 137 included in lower panel 24 and extend upwardly from lower panel 24 into drawer-receiving cavity 20. Drawer-guide slides 134, 135 cooperate with slide-receiver channels 150, 151 to block drawer 14 from moving toward left or right sides 40, 44 of seat bottom 36 to avoid binding of drawer 14 when drawer 14 moves relative to seat bottom 36.

Drawer 14 slides through drawer aperture 22 arranged along front side 82 of seat bottom 36 to move from the closed position to the opened position as shown in FIGS. 4-6. When drawer 14 is in the closed position, drawer 14 is positioned to lie inside drawer-receiving cavity 20 included in base 12 as shown in FIG. 5. When drawer 14 is in the closed position, only front wall 148 is accessible to a caregiver. When drawer 14 is moved to the opened position, drawer 14 extends out of seat bottom 36 as shown in FIG. 6. In the opened position, storage volume 154 is accessible to a caregiver.

In the illustrative embodiment, a juvenile vehicle seat 10 further includes a drawer-motion controller 160 as shown in FIG. 3. drawer-motion controller 160 is illustratively coupled to seat bottom 36. Drawer-motion controller 160 includes a release tab flange 164 and a release tab 166 coupled to release tab flange 164. Release tab flange 164 is illustratively formed in seat pad 30 near front side 82 of seat bottom 36.

Lock 160 is adapted to move from the locked position, arranged to block drawer 14 from moving from the closed position to the opened position, to the unlocked position, arranged to allow drawer 14 to move from the closed position to the opened position as suggested in FIGS. 4-6. drawer-motion controller 160 moves from the locked position to the unlocked position in response to force 168 being applied to release tab 166 as suggested in FIG. 5. As shown in FIG. 6, when drawer-motion controller 160 is in the unlocked position, drawer 14 is allowed to move from the closed position to the opened position.

Juvenile vehicle seat 10 may further include a seat back 198 coupled to seat bottom 36 and arranged to extend upwardly from seat bottom 36 as shown, for example, in FIG. 8. Seat back 198 includes a connector 170, a backrest 172, and a headrest 174. Connector 170 is adapted to couple to seat back mount 120 included in seat bottom 36. Backrest 172 extends upwardly from connector 170 and is adapted to support the child's back. Headrest 174 extends upwardly from backrest 172 and is adapted to support the child's head. In some embodiments, headrest 174 may be coupled to backrest 172 for movement upwardly and downwardly relative to backrest 172.

Another illustrative juvenile vehicle seat 2010 is shown in FIGS. 9-18. Juvenile vehicle seat 2010 is substantially similar to juvenile vehicle seat 10 shown in FIGS. 1-8 and described herein. Accordingly, similar reference numbers in the 2000 series indicate features that are generally common between juvenile vehicle seat 10 and juvenile vehicle seat 2010. The description of juvenile vehicle seat 10 is hereby incorporated by reference to apply to juvenile vehicle seat 2010, except in instances when it conflicts with the specific description or drawings of juvenile vehicle seat 2010.

Unlike juvenile vehicle seat 10, juvenile vehicle seat 2010 includes a drawer-motion controller 2160 coupled to the drawer 2014 as shown in FIGS. 9-11. Drawer-motion controller 2160 moves from a locked position (as shown in FIGS. 9 and 13) to an unlocked position (as shown in FIGS. 10 and 15). In the locked position, drawer-motion controller 2160 blocks movement of drawer 2014 from the closed position to the opened position as suggested in FIG. 9. In the unlocked position, drawer-motion controller 2160 allows movement of the drawer 2014 from the closed position to the open position as suggested in FIGS. 10 and 11. Also unlike juvenile vehicle seat 10, juvenile vehicle seat 2010 includes a right bin 2050, cup holder 2052, and a left storage basket 2070 formed in an upper shell 2018 thereof. Further unlike juvenile vehicle seat 10, juvenile vehicle seat 2010 includes left and right arm-rests 2301, 2302 each having left and right arm-rest pads 2309, 2310 and left and right arm-rest sleeves 2303, 2304 respectively. Left and right arm-rest sleeves 2303, 2304 pass through left and right arm-rest apertures 2305, 2306 formed in the upper shell 2018 and couple to left and right arm-rest guides 2307, 2308 formed on a lower panel 2024 of a lower shell 2016 respectively. However, left and right arm-rests 2301, 2302 guide child restraint belt 19 over a forwardly-opening belt-guide channel 2102 formed on left and right guide posts 2094, 2096 when the child is seated on seat pad 2030 much like the left and right brackets 90, 92 of juvenile vehicle seat 10.

Drawer-motion controller 2160 includes a flex tab 2212, a handle 2214, and a latch 2216 as shown, for example, in FIGS. 12 and 13. Flex tab 2212 is coupled to floor 2140 and flexes relative to floor 2140 about a flex line (sometimes called a living hinge or axis) 2216L. Handle 2214 is coupled to flex tab 2212 and is accessible to a caregiver reaching through a handle aperture 2152 formed in a front wall 2148 of drawer 2014. Latch 2216 extends downwardly from flex tab 2212 and is arranged to mate with a latch-retainer 2220 included in base 2012 to block drawer 2014 from movement relative to base 2012 when drawer-motion controller 2160 is in the locked position.

Flex tab 2212 is illustratively defined by parallel, spaced apart slits 2221, 2222 formed through floor 2140 of drawer 2014 as shown in FIG. 12. Flex tab 2212 includes a main panel 2224, a handle-retention bridge 2226, and left and right handle-retention blocks 2227, 2228 as shown in FIGS. 12 and 13. Main panel 2224 is generally co-planar with floor 2140 of drawer 2014 and biases drawer-motion controller 2160 toward the locked position. Handle-retention bridge 2226 extends along a front edge 2224F of main panel 2224 and is formed to include a handle-receiving slot 2226S through which handle 2214 extends to hold handle 2214 in place relative to main panel 2224. Left and right handle-retention blocks 2227, 2228 are arranged at left and right sides of main panel 2224 along flex line 2216L. Each handle-retention block 2227, 2228 has an inverted-L-shaped and is arranged to hold handle 2214 in place relative to main panel 2224.

Handle 2214 is illustratively mounted to flex tab 2212 to move flex tab 2212 and may be lifted upwardly to unlock drawer-motion controller 2160 as suggested by arrow 2214A in FIGS. 9-11. Handle 2214 includes a grip 2230 and a grip mount 2232 as shown, for example, in FIG. 12. Grip 2230 is arranged in a downwardly-opening channel 2234 formed by a front panel 2235, a back panel 2236, and a top panel 2237 included in front wall 2148 of drawer 2014 as shown, for example, in FIG. 14. Grip mount 2232 extends from grip 2230 through a pass-through aperture 2249 formed in back panel 2236 of front wall 2148 and is held in contact with main panel 2224 of flex tab 2212 by handle-retention bridge 2226 and handle-retention blocks 2227, 2228.

Grip mount 2232 illustratively includes a mount panel 2240 along with left and right retainer lugs 2241, 2242 as shown in FIG. 12. Mount panel 2240 is formed to include a mount slot 2244 that divides mount panel 2240 into left and right strips 2246, 2248. Mount slot 2244 allows left and right strips 2246, 2248 of grip mount 2232 to move toward one another during assembly of the drawer-motion controller 2160. Left and right retainer lugs 2241, 2242 are coupled to corresponding left and right strips 2246, 2248 of mount panel 2240. Each retainer lug 2241, 2242 mates with a corresponding handle-retention block 2227, 2228 of flex tab 2212 to block movement of grip mount 2232 through pass-through aperture 2249 after assembly of drawer-motion controller 2160.

Latch 2216 of drawer-motion controller 2160 extends downwardly from flex tab 2212 and engages latch retainer 2220 included in base 2012 when drawer-motion controller 2160 is in the locked position as shown in FIGS. 13 and 14. Latch 2216 is illustratively formed to include a blocker wall 2250 and a tab-biasing ramp 2252 as shown in FIG. 14. Blocker wall 2250 is arranged in relation to a corresponding motion-blocker wall 2254 included in latch retainer 2220 to block or allow movement of drawer 2014 from the closed position to the opened position as suggested in FIGS. 14 and 16. Tab-biasing ramp 2242 faces a latch-camming ramp 2256 formed by latch retainer 2220 included in base 2012 when drawer 2014 is in the opened position as shown in FIG. 18. Tab-biasing ramp 2242 and latch-camming ramp 2256 cooperate so that latch 2216 of drawer-motion controller 2160 is temporarily moved upwardly over latch-retainer 2220 during movement of the drawer 2012 from the opened position to the closed position without requiring that a caregiver lift upwardly on handle 2214.

Latch 2216 cooperates with latch retainer 2220 to provide a lock 2225 for blocking or allowing movement of drawer 2014 as shown in FIG. 12. Lock 2225 provides means for blocking movement of drawer 2014 from the closed position to the opened position when handle 2214 is in a lowered position within the downwardly-opening channel 2234 formed by front wall 2148 of drawer 2014 and for allowing movement of drawer 2014 from the closed position to the openend position when handle 2214 is in a raised position within the downwardly-opening channel 2234 formed by front wall 2148 of drawer so that drawer 2014 is held in the closed position to keep items stored in drawer 2214 secured in drawer 2014 until a caregiver lifts upwardly on handle 2214. Tab-biasing ramp 2242 and latch-camming ramp 2256 included in lock 2225 cooperate to further provide means for moving handle 2214 temporarily to the raised position when drawer 2014 is moved from the opened position to the closed position so that latch 2216 of drawer-motion controller 2160 is temporarily moved upwardly over latch-retainer 2220 during movement of the drawer 2012 from the opened position to the closed position without requiring that a caregiver lift upwardly on handle 2214.

When drawer-motion controller 2160 is in the locked position, blocker wall 2250 is arranged over a notch 2258 formed in the lower panel 2024 and in confronting relation with motion-blocker wall 2254 included in latch retainer 2220 to block movement of drawer 2014 from the closed position to the opened position as suggested in FIG. 14. When a user lifts upwardly on grip 2230 of handle 2214, flex tab 2212 and latch 2216 move upwardly with handle 2214 flexing (or pivoting) about flex line 2212L so that blocker wall 2250 is moved out of confronting relation with motion-blocker wall 2254 to allow movement of drawer 2014 from the closed position to the opened position as shown in FIG. 16.

While drawer-motion controller 2160 is in the locked position, a pulling force applied to drawer 2014 as suggested by arrow 2214B will not move drawer 2014 from the closed position to the opened position until a user lifts up on grip 2230 of handle 2214 as suggested by arrow 2214A shown in FIG. 9. Once a user lifts up on grip 2230 of handle 2214, as suggested by arrow 2214A shown in FIG. 10, drawer-motion controller 2160 is unlocked, as suggested in FIG. 10, and a pulling force applied to drawer 2014 as suggested by arrow 2214B will move drawer 2014 from the closed position to the opened position as shown in FIG. 11. Before a user lifts the grip 2230, the main panel 2224 of flex tab 2212 is generally co-planar with floor 2140 of drawer 2014 as shown in FIGS. 10A and 10C. After a user lifts the grip 2230, the main panel 2224 of flex tab 2212 flexes about flex line 2216L rasing latch 2216 relative to floor 2140 of drawer 2014 as shown in FIGS. 10B and 10D.

Drawer 2014 further includes a drawer-stop 2410 as shown in FIGS. 19 and 20. The drawer stop 2410 may include a flexible drawer-stop tab 2401 coupled to the floor 2140 having drawer-stop braces 2402 coupled to a bottom surface of the drawer-stop tab 2401. The drawer-stop braces 2402 arranged to engage latch-retainer 2220 to block drawer 2014 from being completely removed from the drawer-receiving cavity 2020 when pulled out of base 2012 by a caregiver.

Drawer-stop 2410 may further include a drawer-stop release 2403 coupled to a top surface of the drawer-stop tab 2401 and arranged to flex drawer-stop tab 2401 relative to the floor 2140 when a user pulls up on the drawer-stop release 2403 thereby raising the drawer-stop braces 2402 above the latch-retainer 2220 allowing removal of the drawer 2014 from the drawer-receiving cavity 2020. The drawer-stop braces 2402 are formed to include a rearwardly-facing ramp surface 2405 arranged to form an obtuse angle with drawer-stop tab 2401. The rewardly-facing ramp surface 2405 is arranged to engage latch retainer 2220 upon movement of drawer 2014 from outside base 2012 into base 2012 to thereby cause drawer-stop tab 2401 to be flexed upwardly relative to the floor of drawer 2014 so that drawer-stop braces 2402 are lifted up and over latch retainer 2220 to allow drawer 2014 to be pushed into base 2012 during assembly of juvenile vehicle seat 2010.

The invention claimed is:

1. A juvenile vehicle seat comprising
a base adapted to boost a child relative to an underlying vehicle seat, the base including a bottom shell and a top shell, the bottom shell including a floor and an upstanding latch retainer coupled to the floor and arranged to extend upwardly toward the top shell,
a drawer that moves into and out of a drawer-receiving cavity formed between the top shell and the bottom shell of the base, and
a drawer motion controller including a flex tab coupled to the drawer, a handle coupled to the flex tab, and a latch that extends downwardly from the flex tab toward the floor of the bottom shell,
wherein the latch retainer included in the base and the latch included in the drawer-motion controller cooperate to provide lock means for locking the drawer in a closed position arranged mostly inside the drawer-receiving cavity of the base until a caregiver lifts the handle upwardly in a downwardly-opening channel formed by a front wall of the drawer to cause the flex tab and the latch to move upwardly away from the floor of the lower shell to a height above the floor at which the latch is free from engagement with the latch retainer so that the drawer is free to move relative to the base from the closed position to an open position arranged to extend outside the drawer-receiving cavity in response to application of a horizontal pulling force applied to the handle,
wherein the drawer and the flex tab are formed from a monolithic elastic component and the flex tab moves about a flex line arranged at the connection of the flex tab with drawer in response to movement of the handle upwardly into the downwardly-opening channel, and
wherein the handle includes a grip arranged in the downwardly-opening channel formed by the front wall of the drawer and a grip mount that extends from the grip in the downwardly-opening channel to the flex tab to couple the flex tab to the handle for movement therewith, the front wall of the drawer includes a front panel, a back panel, and a top panel that cooperate to define the downwardly-opening channel, and the back panel of the front wall is formed to include a pass-through aperture through which the grip mount extends.

2. The juvenile vehicle seat of claim 1, wherein the flex tab includes a main panel arranged under the grip mount and a handle-retention bridge that extends over the grip mount to hold the grip mount in place relative to the flex tab.

3. The juvenile vehicle seat of claim 1, wherein the latch is formed to include a blocker wall and a tab-biasing ramp, the blocker wall is arranged in relation to the latch retainer to block movement of drawer from the closed position to the opened position when the handle is in a lowered position within the downwardly-opening channel and arranged in relation to the latch retainer to allow movement of drawer from the closed position to the opened position when the handle is in a raised position within the downwardly-opening channel, and the tab-biasing ramp extends from the blocker wall toward the flex tab at an obtuse angle and is arranged to face the latch retainer to engage the latch retainer when the drawer is moved from the opened position to the closed position to temporarily move the flex tab and blocker wall upwardly over the latch retainer.

4. The juvenile vehicle seat of claim 3, wherein the latch retainer is formed to include a motion-blocker wall and a latch-camming ramp, the motion-blocker wall is arranged in confronting relation with the blocker wall of the latch when the drawer is in the closed position and the handle is in the lowered position to block movement of the drawer toward the opened position, and the latch-camming ramp extends from the motion-blocker wall toward the floor of the lower shell at an obtuse angle and is arranged to cooperate with the tab-biasing ramp when the drawer is moved from the opened position to the closed position to temporarily move the flex tab and blocker wall upwardly over the latch retainer.

5. The juvenile vehicle seat of claim 1, wherein the drawer includes a floor, a plurality of walls arranged to extend upwardly from the floor, and a drawer stop, the drawer stop includes a flexible drawer-stop tab coupled to the floor for movement relative to the floor and a drawer-stop brace arranged to extend downwardly from the drawer-stop tab, the drawer-stop brace located to engage the latch retainer when the drawer is moved to the opened position to block the drawer from being removed from the drawer-receiving cavity by a user pulling the drawer out of the base.

6. The juvenile vehicle seat of claim 5, wherein the drawer stop includes a drawer-stop release arranged to extend upwardly from the drawer-stop tab into a storage compartment formed by the drawer to allow a user to lift upwardly on the drawer-stop release so that the drawer-stop tab flexes relative to the floor of the drawer and drawer-stop braces are lifted over the latch retainer thereby freeing the drawer to be pulled out of the base.

7. The juvenile vehicle seat of claim 5, wherein the drawer-stop brace is formed to include a rearwardly-facing ramp surface arranged to form an obtuse angle with the drawer-stop tab and to engage the latch retainer upon movement of the drawer from outside the base into the base causing the drawer-stop tab to be flexed upwardly relative to the floor of the drawer so that the drawer-stop brace is lifted up and over the latch retainer to allow the drawer to be pushed into the base during assembly of the juvenile vehicle seat.

8. A juvenile vehicle seat comprising
a base adapted to boost a child relative to an underlying vehicle seat, the base formed to include a drawer receiving cavity and an upwardly-extending latch retainer extending upwardly toward the drawer-receiving cavity,
a drawer being coupled to the base for movement from a closed position arranged to lie inside drawer-receiving cavity so that a storage volume defined by the drawer is inaccessible to an opened position arranged to extend out of the base so that a storage volume defined by the drawer is accessible, and
a drawer-motion controller coupled to the drawer to block or allow movement of the drawer from the closed position to the opened position, the drawer-motion controller including a flex tab coupled to the drawer, a latch extending downwardly from the flex tab and arranged to engage the latch retainer of the base to block movement of the drawer from the closed position to the opened position, and a handle coupled to the latch for movement therewith and arranged to extend out from inside the storage volume of the drawer,
wherein the handle includes a grip arranged in a downwardly-opening channel formed by a front wall of the drawer and a grip mount that extends from the grip in the downwardly-opening channel to the flex tab to couple the flex tab to the handle for movement therewith, the front wall of the drawer includes a front panel, a back panel, and a top panel that cooperate to define the downwardly-opening channel, and the back panel of the front wall is formed to include a pass-through aperture through which the grip mount extends, and
wherein the flex tab includes a main panel arranged under the grip mount and a handle-retention bridge that extends over the grip mount to hold the grip mount in place relative to the flex tab.

9. The juvenile vehicle seat of claim 8, wherein the latch is formed to include a blocker wall and a tab-biasing ramp, the blacker wall is arranged in relation to the latch retainer to block movement of drawer from the closed position to the opened position when the handle is in a lowered position and arranged in relation to the latch retainer to allow movement of drawer from the closed position to the opened position when the handle is in a raised position, and the tab-biasing ramp extends from the blocker wall toward the flex tab at an obtuse angle and is arranged to face the latch retainer to engage the latch retainer when the drawer is moved from the opened position to the closed position to temporarily move the flex tab and blocker wall upwardly over the latch retainer.

10. The juvenile vehicle seat of claim 9, wherein the latch retainer is formed to include a motion-blocker wall and a latch-camming ramp, the motion-blocker wall is arranged in confronting relation with the blocker wall of the latch when the drawer is in the closed position and the handle is in the lowered position to block movement of the drawer toward the opened position, and the latch-camming ramp extends from the motion-blocker wall toward the floor of the lower shell at an obtuse angle and is arranged to cooperate with the tab-biasing ramp when the drawer is moved from the opened position to the closed position to temporarily move the flex tab and blocker wall upwardly over the latch retainer.

11. The juvenile vehicle seat of claim 8, wherein the drawer includes a floor, a plurality of walls arranged to extend upwardly from the floor, and a drawer stop, the drawer stop includes a flexible drawer-stop tab coupled to the floor for movement relative to the floor and a drawer-stop brace arranged to extend downwardly from the drawer-stop tab, the drawer-stop brace located to engage the latch retainer when the drawer is moved to the opened position to block the drawer from being removed from the drawer-receiving cavity by a user pulling the drawer out of the base.

12. The juvenile vehicle seat of claim 11, wherein the drawer-stop brace is formed to include a rearwardly-facing ramp surface arranged to form an obtuse angle with the drawer-stop tab and to engage the latch retainer upon movement of the drawer from outside the base into the base causing the drawer-stop tab to be flexed upwardly relative to the floor of the drawer so that the drawer-stop brace is lifted up and over the latch retainer to allow the drawer to be pushed into the base during assembly of the juvenile vehicle seat.

13. A juvenile vehicle seat comprising
a base including an upper shell and a lower shell, the lower shell including a floor, an upstanding latch retainer coupled to the floor and arranged to extend upwardly toward the upper shell, and a rear wall coupled to a lower panel spaced apart from the latch retainer and arranged to extend upwardly toward the upper shell,
a drawer arranged to move in a drawer-receiving cavity formed between the upper shell and lower shell between an open position extended away from the rear wall and a closed position and the drawer including a floor, and
a drawer-motion controller including a cantilevered flex tab coupled to the floor of the drawer, a handle coupled to the flex tab, and a latch coupled to the flex tab, the latch arranged to extend downwardly toward the lower panel,
wherein the latch retainer coupled to the lower panel and the latch coupled to the flex tab cooperate to lock the drawer in the closed position until a user grips the handle and moves it upwardly in a handle receiving chamber formed in the drawer to cause the flex tab to move upwardly away from the lower panel to lift the latch to a height above the latch retainer to free the latch from engagement with the latch retainer so that the drawer is free to move relative to the base from the closed position to the open position in response to a horizontal pulling force on the handle, and wherein the handle receiving chamber is positioned at a front end of the drawer, the floor includes a rear portion located in a spaced-apart relation to the handle receiving chamber and a front portion positioned to lie between the handle receiving chamber and the rear portion, the front portion is formed to include a tab-receiving aperture, and the flex tab is arranged to lie in the tab receiving aperture and is coupled to the front portion of the floor to bend along a flex line extending laterally across the floor and separating the front portion and rear portion of the floor.

14. The juvenile vehicle seat of claim 13, wherein the lower shell further includes a notch formed in the lower panel between the latch retainer and rear wall and the latch is positioned over the notch while the drawer is in the closed position.

15. The juvenile vehicle seat of claim 13, wherein the handle includes a grip and a grip mount and the grip mount is coupled to the flex tab and arranged in confronting relation with the flex tab.

* * * * *